United States Patent

[11] 3,633,716

[72] Inventor: Gunther Gortz
Wustenhausen, Germany
[21] Appl. No.: 28,471
[22] Filed: Apr. 14, 1970
[45] Patented: Jan. 11, 1972
[73] Assignee: Firma Dr.-Ing. h. c. F. Porsche K.G.
Stuttgart-Zuffenhausen, Germany
[32] Priority: Apr. 16, 1969
[33] Germany
[31] P 19 19 294.0

[54] SYNCHRONOUS DEVICE FOR CHANGE-SPEED GEARS ESPECIALLY FOR MOTOR VEHICLES
9 Claims, 2 Drawing Figs.

[52] U.S. Cl. .................................................... 192/53 C
[51] Int. Cl. ..................................................... F16d 23/04
[50] Field of Search ......................................... 192/53 C

[56] References Cited
UNITED STATES PATENTS
3,378,122  4/1968  Funiciello .................. 192/53 C
FOREIGN PATENTS
924,798  5/1963  Great Britain ................ 192/53 C Primary Examiner—Allan D. Herrmann
Attorney—Craig, Antonelli and Hill ABSTRACT: A synchronous device for change-speed gears, especially for motor vehicles, wherein slotted rings are under the influence of a locking means for increasing the servo effect which are arranged between each of the springy slotted rings and the hub of its associated clutch body. The locking means includes a slotted band having a camlike form body in the shape of an arched depression disposed in a recess in the associated clutch body and cooperates with a slidable stop extending between the ends of the ring. The working direction which serves for the reverse shifting of a speed is provided with a larger, effective gripping length than is provided for shifting to a higher gear.

PATENTED JAN 11 1972

3,633,716

Inventor:

GÜNTHER GÖRTZ

By Craig, Antonelli, Stewart & Hill
Attorneys 3,633,716

SYNCHRONOUS DEVICE FOR CHANGE-SPEED GEARS ESPECIALLY FOR MOTOR VEHICLES

BACKGROUND OF THE INVENTION

The present invention relates to a synchronous device for change speed gears, especially for motor vehicles, and more particularly, to a synchronous device in which slotted correcting rings are under the influence of locking means that increase the servo effect thereof and which are arranged between each of the springy correcting rings and the hub of its associated clutch body and cooperate with a slidable stop extending between the ends of the ring.

In order to increase the servo action of slotted correcting rings, German Pat. No. 1,038,925 shows that it is conventional to use locking means in the form of locking bands which are arranged between stops, which face each other, on the clutch body of the gear to be shifted. In the usual construction, a locking band segment is provided for each working and circumferential direction which supports itself at a fixed stop. The disadvantage of this arrangement regarding the locking band, however, inheres in the multiple construction of the lock.

German Pat. No. 939,730 shows a known single band which completely embraces the clutch body and which is supported in the plane between the ends of the correcting ring in the circumferential direction. Locking bands of this type may cause self-locking in the synchronous device, which explains why such locking bands have not been successful in practice.

SUMMARY OF THE INVENTION

It is the aim of the present invention to overcome the aforementioned problems and disadvantages and to simplify the means for increasing the servo action for maintaining a predetermined locking action while, at the same time, reducing the cost of manufacturing and assembly.

The underlying problems are solved in accordance with the present invention by forming the locking means from a slotted band that accommodates the slidable stop between itself and which is supported between its ends in the circumferential direction by means of a camlike form body in a recess of the clutch body of the gear to be shifted.

In an advantageous manner, the camlike form body is constructed as an arched impression between the ends of the locking band. Appropriately, each circumferential or working direction of the locking band has an equal, effective length between the camlike form body assigned thereto.

In the case of special extreme deviations in the produced synchronous work, the construction of the present invention may be accomplished in such a manner that the working direction which serves for the reverse shifting of a speed is provided with a larger effective gripping band length than is necessary for shifting to a higher speed.

The advantages of the present invention reside, above all, in the fact that a complicated part such as the stop at the clutch body is eliminated as opposed to the conventional construction and the locking band itself receives a better radial support which has a beneficial effect on the synchronous work. Through corresponding design of the abutment for the locking band, the measure or dimension of the locking effect may, in a given case, be accommodated in a simple manner.

BRIEF DESCRIPTION OF THE DRAWING

These and other features, advantages and objects of the present invention will become more apparent from the following description when taken in conjunction with the accompanying drawing which shows, for purposes of illustration only, an embodiment in accordance with the present invention and wherein.

DETAILED DESCRIPTION OF THE DRAWING

Figure 1:
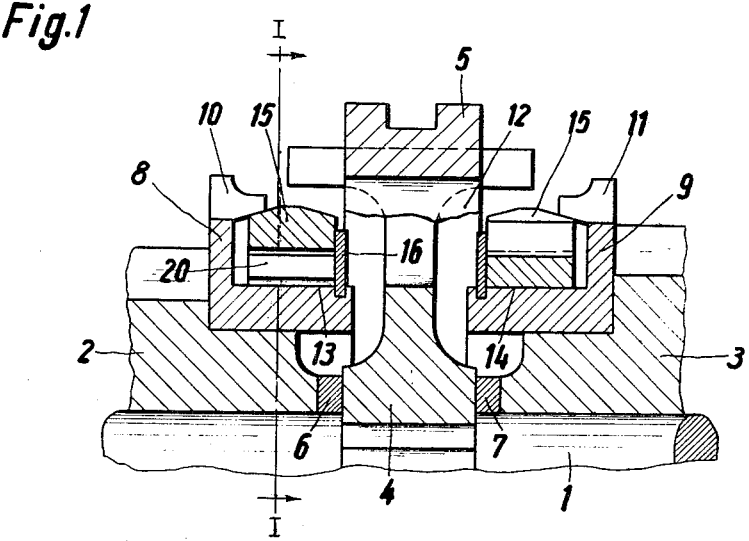
FIG. 1 is a vertical center longitudinal sectional view through a portion of a change speed gear for a motor vehicle incorporating locking bands in accordance with the present invention.

Referring now to the drawings and, in particular, to FIG. 1, there is shown a partial view of a gear, wherein gears 2 and 3 rotate with respect to drive shaft 1 but are not shiftable in the longitudinal direction with respect thereto. Gears 2, 3 are in constant engagement with gears (not shown) arranged on a driven shaft. A carrier support 4 is keyed onto shaft 1 and carries a shifting sleeve 5. Stop disks 6 and 7 which are arranged between the carrier support 4 and gears 2,3 serve as a butting face for the gears.

Clutch bodies 8 and 9 are fixed on the hub of gears 2, 3, respectively, and are provided with shifting teeth 10 and 11 which engage with corresponding shifting teeth 12 of the shifting sleeve 5 at the end of the shifting process. Slotted, springy and pretensioned synchronous rings 15 are arranged on the hubs 13 and 14 of clutch bodies 8 and 9. The rings 15 are secured against longitudinal shifting by clamp ring 16. Inasmuch as each of the synchronous devices are constructed identically, it is necessary to only describe one in order to understand both.

In the working direction R, a slidably supported stop 17 which is arranged on the hub 13 is associated with the synchronous ring 15. The nose 18 of stop 17 extends between the ends 19, 19' of the synchronous ring. A locking band 20 is arranged between the synchronous ring 15 and the hub 13 which band is basically cylindrical in form and is made of spring steel. The slotted ends 21, 21', respectively, of locking band 20 cooperate operatively with the arms 22, 22' of stop 17.

In the center between ends 21, 21' the locking band 20 is provided with a camlike depression 23 which is supported in a correspondingly constructed counter surface 24 of the cutout portion 25 in clutch body 8. The counter surface 24 may, as shown at the left side in FIG. 2 in dashed lines, receive various forms corresponding to the desired wedge angle which determines the measure of the locking force.

During the shifting operation, the shifting sleeve 5 is shifted from its neutral position either to the left or to the right depending upon which gear speed is desired to be shifted into. As a result, the head surfaces of the shifting teeth 12 are brought into frictional contact with the circumferential surface of the synchronous ring 15. When the synchronous ring 15 is carried along on the working direction of arrow R, the end 19 thereof pushes against the nose 18 and attempts, through stop 17 and arm 22', to rotate the right half A of the locking band 20 which is prevented, however, by the camlike form body 23. The locking band half A is, as a result, tensioned against the inner surface of the synchronous ring 15 whereby the servo effect thereof is increased. When synchronous speed is attained, the tension of the locking band is released whereafter the shifting sleeve 5 may be brought into engagement beyond the synchronous ring 15 with the shifting teeth of the corresponding clutch body. The same process is repeated when, through reversal of the direction of rotation R, the locking band half B is braced.

Figure 2:
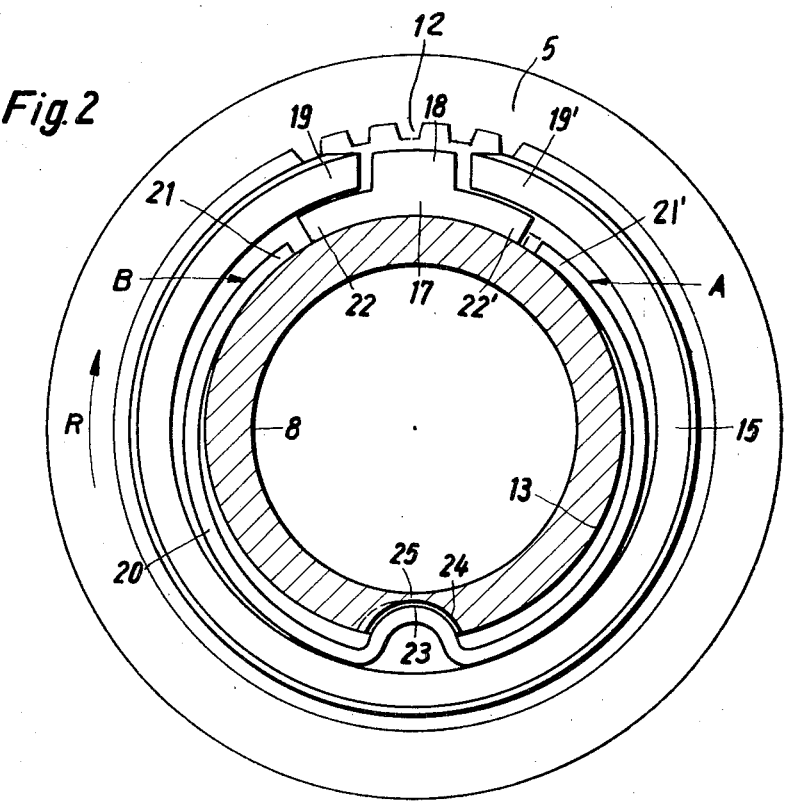
FIG. 2 is a cross-sectional view through a synchronous device in the plane I—I of FIG. 1.

By changing the effective length of the parts A and B of band 20 as shown in dashed lines in FIG. 2, it is possible to effect different synchronous force transfers depending on the direction of rotation of the synchronous ring 15. In this way a larger effective gripping band length can be provided for reverse or downshifting than for shifting into a higher speed.

It is to be clearly understood that the present invention is not to be limited to the embodiment shown and described herein, but as susceptible to numerous changes and modifications as will be apparent to one skilled in the art. For example, the camlike form body may, together with the locking band, by made from on extruded profile. I, therefore, do not wish to be limited to the details shown and described herein but intend to cover all such changes and modifications as are encompassed within the scope of the present invention.

I claim:

1. Synchronous device for change speed gears, especially for motor vehicles, of the type having a slotted synchronous ring positioned between a driving gear and a driven gear for selectively and synchronously transferring rotational forces from the driving gear to the driven gear; comprising a slotted synchronous ring disposed circumferentially about a hub of the driving gear, said ring being in selective abutting engagement with the driven gear, a stop slidably disposed on said hub and having a first portion extending between the ends of said ring, and locking means arranged between said ring and said hub and being operatively associated with said stop for synchronously transferring rotational forces from said synchronous ring to said hub, said locking means including a slotted band having a camlike form body between the ends thereof, said camlike form body being disposed in a recess on said hub, said stop body further including a second portion positioned between the ends of said band.

2. Synchronous device according to claim 1, wherein the camlike form body is disposed at the midpoint of said band.

3. Synchronous device according to claim 1, wherein the camlike form body is disposed closer to one end of said band then the other to provide different effective gripping lengths of said band in dependence on the direction of rotation of the ring.

4. Synchronous device according to claim 3, wherein the longer effective gripping length of said band is provided for the direction of rotation corresponding to a reverse shifting of speed.

5. Synchronous device according to claim 1, wherein the first portion of said stop is narrower in the circumferential direction than the second portion.

6. Synchronous device according to claim 1, wherein said locking means includes means to exhibit greater locking force in one direction of force than in the other.

7. Synchronous device according to claim 1, wherein said slotted band is substantially cylindrical in form and is made of spring steel.

8. Synchronous device according to claim 1, wherein said recess is asymmetric with respect to an axis extending radially from the center of said hub and said camlike form body is symmetric with respect to an axis extending radially from the center of the band.

9. Synchronous device according to claim 1, wherein the camlike form body means is formed by an arched depression in the area between the ends of the slotted band in the circumferential direction.

* * * * *